Patented June 10, 1941

2,245,547

UNITED STATES PATENT OFFICE 2,245,547

METHOD OF PREPARING HALO ACRYLIC ESTERS

Maxwell A. Pollack, Akron, Ohio, assignor to Pittsburgh Plate Glass Company, Allegheny County, Pa., a corporation of Pennsylvania No Drawing. Application October 19, 1939
Serial No. 300,200

20 Claims. (Cl. 260—486)

This invention relates to a method of producing monomeric esters of alpha haloacrylic acid, particularly esters of alpha chloracrylic acid. In accordance with the present invention, I have found that these esters may be secured by dehydrohalogenation of the corresponding esters of dihalopropionic acid or substituted dihalo propionic acids such as alpha beta-dichloro propionic acid or of alpha, alpha dichloro propionic acid, or the corresponding bromo, iodo, or fluoro derivatives. In general, the process may be conducted more easily and with substantially higher yields by treatment of the esters of alpha beta-dihalo-propionic acid.

Various esters may be so treated, such as the alkyl esters, including the methyl, ethyl, propyl, butyl, amyl, n-hexyl, octyl, lauryl, octadecyl esters of dichloropropionic acid. Similarly, the corresponding alkenyl esters such as the allyl, methallyl, crotyl, oleyl, or chlorallyl esters may be treated to form the corresponding unsaturated esters of alpha-chloracrylic acid, or the polyhydric esters such as the glycol, glycerol, and mannitol esters or the aryl, heterocyclic, cycloparaffinic, etc. esters such as phenyl, cresyl, resorcinyl, naphthyl, benzyl, fenchyl, cyclohexyl, furfuryl, thienyl, etc. esters may be treated in like manner.

The dehydrohalogenation may be secured by various methods. In accordance with one successful method, I have been able to conduct the dehydrohalogenation by treatment of the esters with a suitable alkaline agent capable of reacting with hydrogen halides such as an alkali metal or alkaline earth metal hydroxide for example, sodium, potassium, calcium or magnesium hydroxides, or the corresponding bicarbonate or carbonates of the alkali metal or alkaline earth metals. Sodium carbonate has been found to be particularly suitable for this purpose.

Since the esters may tend to saponify during treatment it is generally desirable to avoid their prolonged contact with excess alkali. Accordingly, the dehydrohalogenation may be conducted by addition of the alkali to the dichloropropionic ester and/or the removal of the resulting ester substantially as rapidly as formed. This procedure is also effective in the avoidance of polymerization and contamination of the chloracrylic or haloacrylic ester. To remove the ester in this manner the dehydrohalogenation may be conducted under vacuum and the chloracrylic or haloacrylic ester may be removed by distillation as it is formed.

In conducting the dehydrohalogenation with alkalies it is desirable to insure the presence of some quantity of water. Since the action of water apparently is catalytic, small quantities are sufficient and often traces of water are sufficient. This is particularly true when compounds containing water of constitution such as sodium or potassium hydroxide or bicarbonate are used as the dehydrohalogenating agent. For most purposes, it is desired to avoid the presence of sufficient water to cause formation of a solution since it has been observed that when aqueous solutions of the alkalies are used, substantially lower yields are obtained. Thus, solid sodium carbonate, hydroxide or bicarbonate or nonaqueous solutions thereof are found preferable. In general, the water generated during the reaction is sufficient for most purposes.

Often it is desirable to conduct the dehydrohalogenation in the vapor phase, for example, by thermal dehydrohalogenation processes. In such a case, the process may, if desired, be conducted in the presence of suitable catalysts, such as carbon black, powdered alumina, clays, calcium chloride, silica gel, ferric chloride, aluminum chloride, or other metallic chloride dehydrohalogenating agent.

In order to dehydrohalogenate such esters thermally, it is generally necessary to heat the ester to temperatures above 100° C., although the required temperature is dependent upon the presence and nature of catalysts used in the reaction. The haloacrylic ester thus produced is removed rapidly from the dehydrohalogenation zone and cooled in order to prevent or minimize polymerization thereof. In order to minimize polymerization and to insure high yields, the dehydrohalogenation may be conduced in the presence of gaseous diluents such as nitrogen or carbon dioxide, etc.

In order to prevent polymerization, it is often desirable to conduct the dehydrohalogenation in the presence of a small amount of a polymerization inhibitor, such as hydroquinone, phenylene diamine, sulfur compounds, copper or copper compounds, etc.

The following examples are illustrative:

*Example I.*—A mixture of 15.7 parts by weight of methyl alpha beta dichloropropionate, 10.6 parts by weight of solid sodium carbonate containing 0.3 percent water and 0.5 part of hydroquinone was heated under a distillation column to a temperature of 150° C. Carbon dioxide rapidly evolved and a two-phase mixture gradually distilled at 85° C. The distillate, containing water and methyl alpha chloracrylate was dried and redistilled, pure methyl alpha chloracrylate being recovered. The yield of this product was about 80 percent of the theoretical.

*Example II.*—An aqueous slurry containing 82 parts by weight of powdered Na₂CO₃ and 175 parts by weight of water was added to 120 parts by weight of methyl alpha beta dichloropropionate containing 0.5 part of hydroquinone and 0.5 part by weight of cuprous chloride, the temperature being maintained at 10-12° C. The mixture was agitated for three hours, filtered and the filtrate was distilled and methyl alpha chloracrylate was secured.

The invention, while particularly adapted to the production of haloacrylic esters from dihalopropionic esters is not limited thereto but also may be applied to the production of substituted haloacrylic esters from the corresponding substituted dihalopropionic esters such as the alkyl or alkylene esters of beta methyl alpha beta dichloropropionic acid, beta ethyl alpha beta dichloropropionic acid or other ester having the general formula

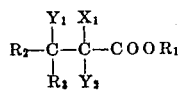

where, R₁, R₂, R₃ are other radicles such as methyl, ethyl, allyl, methallyl, cresyl, phenyl, naphthyl, furfuryl, cyclohexyl, or other alkyl, alkylene, aryl, or araliphatic radicle, X is halogen such as chlorine, bromine, or fluorine, and Y₁ and Y₂ are hydrogen or halogen, at least one being hydrogen and one being halogen.

The terms "a dihalopropionic acid" and "a dichloropropionic acid" is intended to include such substituted products. This application is a continuation-in-part of my copending application Serial No. 181,721, filed December 24, 1937.

Although the present invention has been described and claimed with reference to the specific details of certain embodiments thereof, it is not intended that such details shall be regarded as limitations upon the scope of the invention except insofar as included in the accompanying claims.

I claim:

1. A method of preparing an ester of an alpha haloacrylic acid which comprises dehydrohalogenating an ester of a dihalopropionic acid having at least one halogen in the alpha position.

2. A method of preparing an ester of an alpha haloacrylic acid which comprises dehydrohalogenating an ester of a dihalopropionic acid having at least one halogen in the alpha position, and removing the ester of alpha haloacrylic acid from the zone of dehydrohalogenation substantially as rapidly as it is formed.

3. A method of preparing an ester of alpha chloracrylic acid which comprises dehydrochlorinating an ester of a dichloropropionic acid having at least one chlorine in the alpha position, and removing the ester of alpha chloracrylic acid from the zone of dehydrochlorination substantially as rapidly as it is formed.

4. A method of preparing an ester of alpha chloracrylic acid which comprises contacting an alkaline agent with an ester of a dichloropropionic acid having at least one chlorine in the alpha position to dehydrochlorinate the ester and recovering the resulting ester of alpha chloracrylic acid.

5. A method of preparing an ester of alpha chloracrylic acid which comprises contacting an alkaline agent with an ester of a dichloropropionic acid having at least one chlorine in the alpha position to dehydrochlorinate the ester, and removing the ester of alpha chloroacrylic acid from the zone of dehydrochlorination substantially as rapidly as it is formed.

6. A method of preparing an ester of alpha chloracrylic acid which comprises dehydrochlorinating an ester of alpha beta dichloropropionic acid.

7. A method of preparing an ester of alpha chloracrylic acid which comprises dehydrochlorinating an ester of alpha beta dichloropropionic acid, and removing the ester of alpha chloroacrylic acid from the zone of dehydrohalogenation substantially as rapidly as it is formed.

8. A method of preparing methyl chloracrylate which comprises dehydrochlorinating methyl alpha beta dichloropropionate.

9. A method of preparing an ester of an alpha haloacrylic acid which comprises dehydrohalogenating an ester of a dihalopropionic acid having at least one halogen in the alpha position by contacting said propionic ester with an alkaline agent in the presence of a small amount of water sufficient to assist the reaction but insufficient to form an aqueous liquid phase.

10. A method of preparing an ester of alpha chloracrylic acid which comprises dehydrochlorinating an ester of a dichloropropionic acid having at least one chlorine in the alpha position, by contacting said propionic ester with an alkaline agent in the presence of a small amount of water sufficient to assist the reaction but insufficient to form an aqueous liquid phase.

11. A method of preparing an ester of alpha chloracrylic acid which comprises dehydrochlorinating an ester of alpha beta dichloropropionic acid by contacting said propionic ester with an alkaline agent in the presence of a small amount of water sufficient to assist the reaction but insufficient to form an aqueous liquid phase.

12. A method of preparing an ester of alpha chloracrylic acid which comprises dehydrochlorinating an ester of a dichloropropionic acid having at least one chlorine in the alpha position, by contacting said propionic ester with a sodium carbonate in the presence of a small amount of water sufficient to assist the reaction but insufficient to form an aqueous liquid phase.

13. A method of preparing methyl chloracrylate which comprises dehydrochlorinating methyl alpha beta dichloropropionate by contacting said propionic ester with a sodium carbonate.

14. A method of preparing methyl chloracrylate which comprises dehydrochlorinating methyl alpha beta dichloropropionate and removing methyl chloracrylate from the zone of dehydrochlorination substantially as rapidly as it is formed.

15. A method of preparing an ester of alpha chloracrylic acid which comprises dehydrochlorinating an ester of alpha beta dichloropropionic acid, by contacting said propionic ester with an alkali.

16. A method of preparing an ester of alpha chloracrylic acid which comprises dehydrochlorinating an ester of alpha beta dichloropropionic acid in the presence of a polymerization inhibitor.

17. A method of preparing an ester of chloracrylic acid which comprises dehydrochlorinating an ester of a dichloropropionic acid having at least one chlorine in the alpha position.

18. A method of preparing an ester of alpha halo acrylic acid which comprises dehydrochlorinating an ester of alpha beta dichloropropionic acid.

19. A method of preparing methyl chloroacrylate which comprises dehydrochlorinating methyl alpha beta dichloropropionate by contacting said propionic ester with a solid alkali metal carbonate.

20. A method of preparing an ester of alpha chloracrylic acid which comprises dehydrochlorinating an ester of a dichloropropionic acid having at least one chlorine in the alpha position, by contacting said propionic ester with a solid alkali metal carbonate in the presence of a small amount of water sufficient to assist the reaction but insufficient to form an aqueous liquid phase.

MAXWELL A. POLLACK.